W. SHY, N. T. SPEER & J. R. SHY.
COTTON CHOPPER.
APPLICATION FILED MAR. 5, 1909.
924,845.
Patented June 15, 1909.
2 SHEETS—SHEET 1.
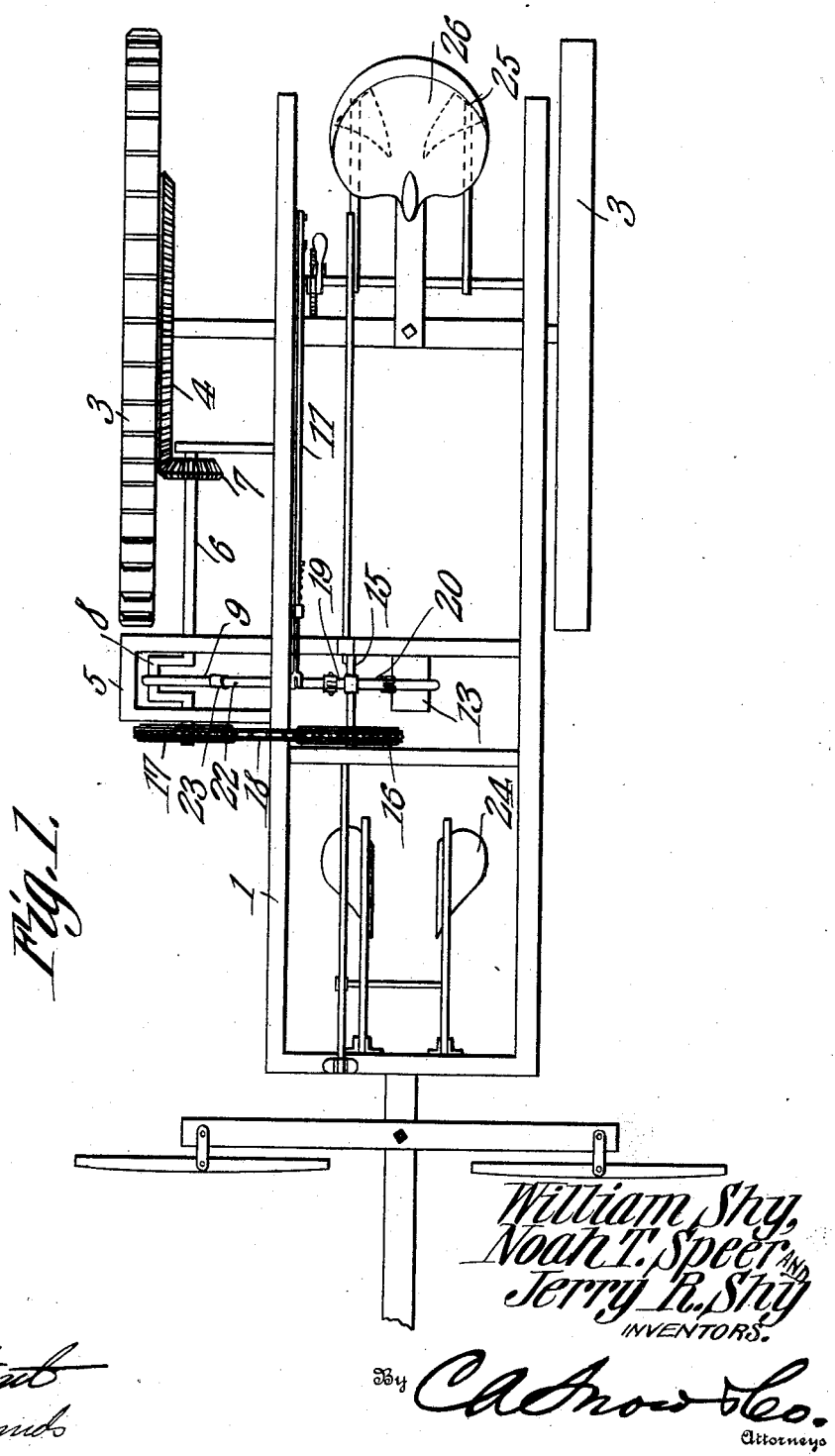

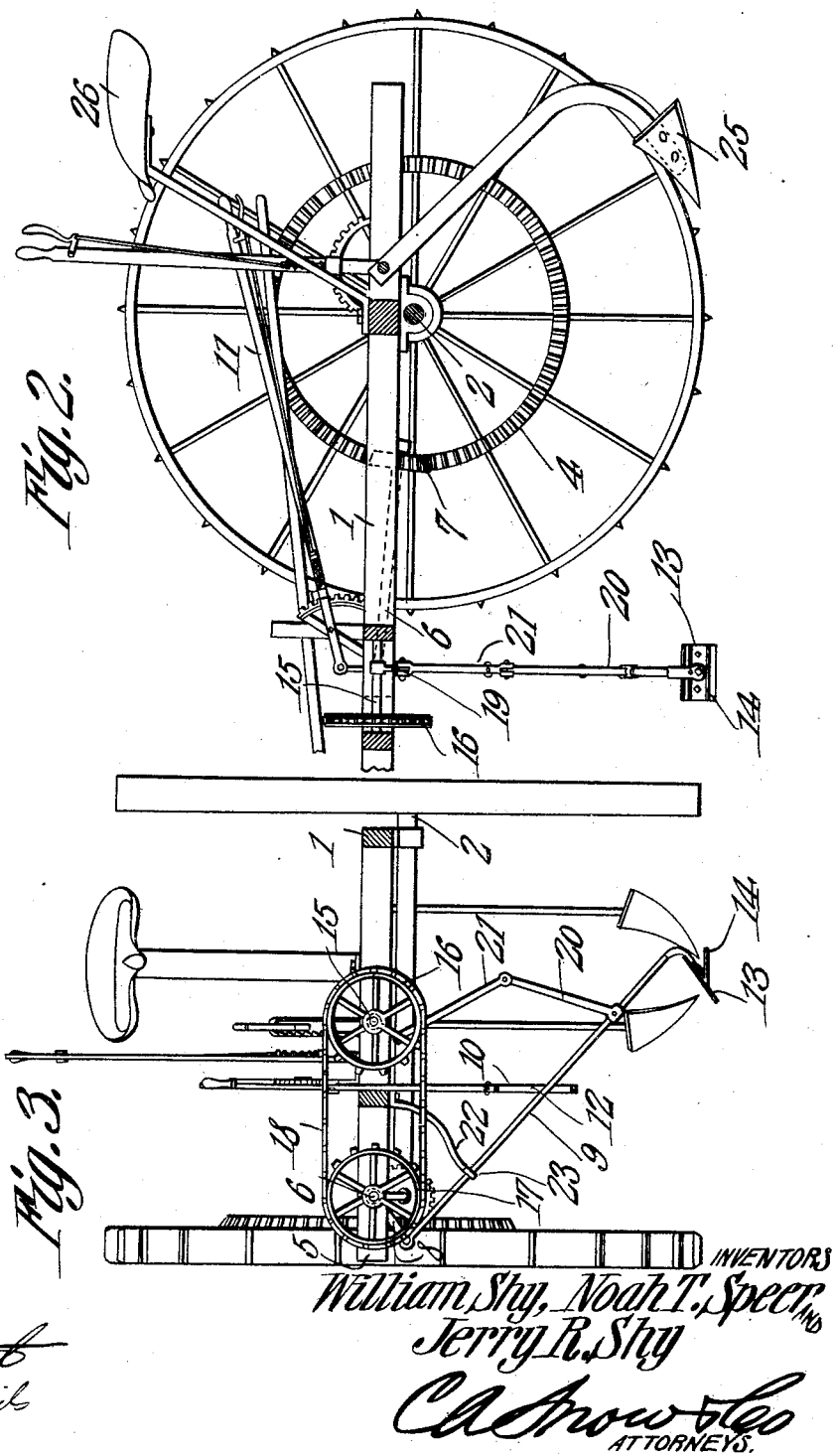

UNITED STATES PATENT OFFICE.

WILLIAM SHY, NOAH THOMAS SPEER, AND JERRY ROBERT SHY, OF NEW MADRID, MISSOURI.

COTTON-CHOPPER.

No. 924,845.  Specification of Letters Patent.  Patented June 15, 1909.

Application filed March 5, 1909. Serial No. 481,331.

*To all whom it may concern:*

Be it known that we, WILLIAM SHY, NOAH THOMAS SPEER, and JERRY ROBERT SHY, citizens of the United States, residing at New Madrid, in the county of New Madrid and State of Missouri, have invented a new and useful Cotton-Chopper, of which the following is a specification.

This invention has relation to cotton choppers and it consists in the novel construction and arrangement of its parts as hereinafter shown and described.

The object of the invention is to provide, in an implement of the character stated, means for chopping out superfluous plants in a row, which means includes, in part, a shaft mounted for reciprocatory movement transversely with relation to the row of plants, and a hoe blade attached thereto with means for regulating the depth at which the blade will penetrate the soil.

A further object of the invention is to provide means for causing the hoe blade to describe an orbit so disposed that the hoe will be in its lowermost position during its chopping stroke, and will be in elevated position while describing its retractory stroke.

A further object of the invention is to provide means for resiliently holding the hoe in position during the chopping stroke.

In the accompanying drawings:—Figure 1 is a top plan view of the cotton chopper. Fig. 2 is a longitudinal vertical sectional view of the same. Fig. 3 is a transverse vertical sectional view of the same.

The cotton chopper consists of a frame 1, which is mounted at its rear end portion upon an axle 2. The axle 2 is supported by the wheels 3, to one of which is concentrically fixed a gear rim 4. The frame 1 is provided with a laterally disposed bracket 5, which extends transversely across the forward portion of the wheel 3 which carries the gear rim 4. A shaft 6 is journaled for rotation in the bracket 5 and extends back toward the center of the wheel 3 carrying the rim 4. A pinion 7 is fixed to the rear end of the shaft 6 and meshes with the gear rim 4. The shaft 6 is provided at its front end portion with a crank 8, to which is pivotally attached one end of a hoe-shaft 9. A guide 10 depends below the bracket 5 and is pivotally connected at its upper end with a lever 11. The said guide 10 is provided with an elongated slot 12, which receives the intermediate portion of the hoe shaft 9. A hoe blade 13 is attached to that end of the shaft 9 opposite the end thereof which is pivotally connected with the crank 8, and a stop 14 is attached to the under side of the said blade 13.

A stub shaft 15 is journaled upon the frame 1, and a sprocket wheel 16 is fixed to the shaft 15. A sprocket wheel 17 is fixed to the forward end of the shaft 6, and a sprocket chain 18 passes around the sprocket wheels 16 and 17. A crank arm 19 is fixed to the shaft 15, and an arm 20 is pivotally connected at its lower end with the lower portion of the hoe shaft 9. A link 21 is pivotally connected at its lower end with the upper end of the arm 20 and is pivotally attached at its upper end to the extremity of the crank arm 19. A spring 22 (of ogee configuration) is attached at its upper end to the bracket 5, and is provided at its lower end with a fork or enlargement 23, which lies in the path of movement of the hoe shaft 9. Plows 24 are attached to the frame 1 in advance of the hoe blade 13, and lister plows 25 are attached to the frame 1 behind the said hoe blade 13. An operator's seat 26 is mounted upon the frame 1, and the operating end of the lever 11 is located within convenient reach of one occupying the seat 26.

From the above description it is obvious that as the implement is drawn along a row of standing plants, the shaft 6 will be rotated through the instrumentality of the gear rim 4 and intermeshing pinion 7, and that as the said shaft 6 rotates and the crank 8 thereof revolves about the axis of the said shaft, the hoe shaft 9 will be moved longitudinally through the slot 12 of the guide 10. Thus the blade 13 will be moved transversely with relation to the row of plants.

By reason of the connection between the lower portion of the hoe shaft 9 and the shaft 15, which connection is through the arms 19 and 20 and link 21, the hoe blade 13 describes an orbital course during its reciprocatory movement with relation to the row of plants, and when the hoe descends to chop out the superfluous plants, the shaft 9 is subjected to tension from the spring 22, the end of which bears laterally against the side of the said shaft. Thus it will be seen that means is provided for resiliently holding the hoe against its work during the chopping stroke. When however the hoe is in retractory movement, it is elevated and the shaft 9 is not subjected to tension from the spring 22.

Should the hoe blade 13 strike a rock or other obstruction too heavy to be readily moved, the pivotal connection between the arm 20 and link 21 will cause the said arm 20 to swing with relation to the said link, or vice versa, and thus the hoe blade 13 may move vertically sufficiently to pass over the said obstruction without damage to the hoe shaft or its attachments. It will also be seen that when it is desired to move the implement without permitting the hoe blade 13 to encounter the ground, that the lever 11 may be swung upon its fulcrum, whereby the guide 10 will be elevated and the lower end portion of the hoe shaft 9 will be swung up upon the connection with the crank 8 as a pivot. During such movement on the part of the hoe shaft 9 the arm 20 will swing with relation to the link 21, or vice versa, and thus, while the shaft 9 is not checked in its reciprocatory movement, the hoe blade 13 is raised sufficiently to clear the surface of the soil. In a like manner the guide 10 may be so adjusted as to regulate the depth at which the hoe blade 13 will enter below the surface of the soil, and, furthermore, by reason of the runner 14 attached to the under side of the blade 13, the depth at which the said blade 13 will enter the soil is regulated, notwithstanding the downward pressure upon the shaft 9 exercised by the spring 22.

Having described the invention, what we claim as new, and desire to secure, by Letters Patent, is:—

1. A cotton chopper comprising a wheel supported frame having a laterally disposed bracket, a shaft journaled for rotation in the bracket and having means operatively connecting the same with one of the supporting wheels of the frame, said shaft having a crank, a stub shaft journaled upon the frame parallel with the first said shaft, means for transmitting movement from the first said shaft to the stub shaft, a hoe blade pivotally attached to the crank of the first said shaft, a hoe carried by said hoe shaft, a crank attached to the second said shaft, an arm pivotally connected with the lower portion of the hoe shaft, and a link pivotally connecting said arm with the crank on the said second shaft.

2. A cotton chopper comprising a wheel mounted frame having a laterally disposed bracket, a shaft having a crank and journaled in the bracket and being operatively connected with one of the supporting wheels of the frame, a stub shaft journaled for rotation upon the frame and extending approximately parallel with the first said shaft, means for transmitting rotary movement from the first said shaft to the stub shaft, a hoe shaft pivotally connected at one end with the crank of the first said shaft, a crank mounted upon the stub shaft, an arm pivotally connected with the hoe shaft, a link pivotally connecting the said arm with the crank upon the stub shaft, a hoe blade carried by the hoe shaft, and a spring attached at one end to a fixed point and bearing against the said hoe shaft and adapted to yieldably hold the same in position against its work.

3. A cotton chopper comprising a wheel mounted frame having a laterally disposed bracket, a shaft journaled for rotation in said bracket and having a crank, means operatively connecting the said shaft with one of the supporting wheels of the frame, a stub shaft journaled for rotation upon the frame, means for transmitting rotary movement from the first said shaft to the stub shaft, a hoe shaft pivotally connected at one end with the crank of the first said shaft, a hoe blade attached to the said hoe shaft, a stop fixed to the under side of the hoe blade, a vertically adjustable guide having an opening receiving said hoe shaft, means for moving the guide, a crank attached to the stub shaft, an arm pivotally connected at one end with the hoe shaft, a link pivotally connecting said arm with the crank of the stub shaft, a spring fixed at one end and bearing at its opposite end against the hoe shaft, and adapted to yieldably hold the hoe in engagement with its work.

In testimony that we claim the foregoing as our own, we have hereto affixed our signatures in the presence of two witnesses.

WILLIAM SHY.
NOAH THOMAS SPEER.
JERRY ROBERT SHY.

Witnesses:
JOHN W. JACKSON,
ADOLPH O. COOK.